United States Patent
Li et al.

(10) Patent No.: US 9,760,225 B2
(45) Date of Patent: Sep. 12, 2017

(54) CIRCUIT DEVICE AND MANUFACTURING METHOD THEREOF

(71) Applicant: TPK Touch Systems (Xiamen) Inc., Xiamen (CN)

(72) Inventors: Jui-Hsing Li, Taoyuan (TW); Lixian Chen, Xiamen (CN); Tengyue Zeng, Xiamen (CN)

(*) Notice: Subject to any disclaimer, the term of this patent is extended or adjusted under 35 U.S.C. 154(b) by 7 days.

(21) Appl. No.: 14/675,755

(22) Filed: Apr. 1, 2015

(65) Prior Publication Data

US 2015/0286319 A1 Oct. 8, 2015

(30) Foreign Application Priority Data

Apr. 4, 2014 (CN) .......................... 2014 1 0142767

(51) Int. Cl.
*G06F 1/16* (2006.01)
*H01B 13/00* (2006.01)
*G06F 3/044* (2006.01)

(52) U.S. Cl.
CPC ................ *G06F 3/044* (2013.01); *G06F 1/16* (2013.01); *G06F 2203/04103* (2013.01); *G06F 2203/04107* (2013.01)

(58) Field of Classification Search
None
See application file for complete search history.

(56) References Cited

U.S. PATENT DOCUMENTS

| | | | | |
|---|---|---|---|---|
| 2009/0153513 A1* | 6/2009 | Liu | .......................... | G06F 3/044 345/173 |
| 2010/0045625 A1* | 2/2010 | Yang | ....................... | G06F 3/044 345/173 |
| 2010/0321621 A1* | 12/2010 | Kikuchi | ................... | G06F 3/044 349/122 |
| 2012/0092325 A1* | 4/2012 | Katano | ............... | A63F 13/5258 345/419 |
| 2012/0298497 A1* | 11/2012 | Maeda | ................. | C09J 133/064 200/600 |
| 2012/0313886 A1* | 12/2012 | Hu | .......................... | G06F 3/044 345/174 |
| 2013/0168138 A1* | 7/2013 | Yamazaki | ............ | H05K 1/0296 174/253 |
| 2013/0258570 A1* | 10/2013 | Nashiki | ................... | G06F 3/044 361/679.01 |
| 2014/0063373 A1* | 3/2014 | Wu | ...................... | G02F 1/13338 349/12 |
| 2014/0098307 A1* | 4/2014 | Iwami | ..................... | B32B 15/02 349/12 |
| 2014/0152909 A1* | 6/2014 | Liao | ........................ | G06F 3/044 349/12 |
| 2015/0070298 A1* | 3/2015 | Shih | .................... | G02F 1/13338 345/174 |
| 2015/0090689 A1* | 4/2015 | Guilfoyle | ............. | C09J 133/068 216/13 |
| 2015/0277616 A1* | 10/2015 | Wang | ...................... | G06F 3/044 345/174 |

* cited by examiner

Primary Examiner — Shamim Ahmed

(57) ABSTRACT

A circuit device is provided. The circuit device comprises a transparent substrate, a first transparent blocking layer, a first patterned conductive layer, and a second conductive layer. The transparent substrate has a first surface. The first transparent blocking layer is disposed on the first surface. The first patterned conductive layer is disposed on the first transparent blocking layer, and the second conductive layer is disposed on a side of the transparent substrate opposite to the first surface.

6 Claims, 10 Drawing Sheets

device and the manufacturing method thereof of the present disclosure has a better yield rate.

CIRCUIT DEVICE AND MANUFACTURING METHOD THEREOF

BACKGROUND OF THE INVENTION

This application claims priority to Chinese Application Serial Number 201410142767.8, filed on Apr. 4, 2014, which is herein incorporated by reference.

FIELD OF THE INVENTION

The present disclosure relates to a circuit device, and more particularly, to a circuit device suitable for a touch panel, and a manufacturing method thereof.

DESCRIPTION OF THE RELATED ART

In transparent circuit devices applied to touch panels, LCD displays, solar cells, special windows, photoelectric equipment and the like, a manufacturing method using laser etching technology to form a patterned conducting film has been widely applied. Taking manufacturing a capacitive touch panel as an example, in the process of making the capacitive touch panel, sputtering is used to form an upper layer conducting film and a lower layer conducting film on two opposite sides of a transparent substrate, respectively, then laser etching is used to pattern the upper layer conducting film and the lower layer conducting film, respectively, to form a patterned conductive layer, namely, a sensor electrode of the touch panel.

SUMMARY OF THE DISCLOSURE

The present disclosure provides a circuit device and a manufacturing method thereof for promoting the device yield rate of the conducting film etching process.

According to some embodiments, the present disclosure provides a circuit device with light transparency, comprising a transparent substrate, a first transparent blocking layer, a first patterned conductive layer and a second conductive layer. The transparent substrate has a first surface. The first transparent blocking layer is disposed on the first surface. The first patterned conductive layer is disposed on the first transparent blocking layer. The second conductive layer is disposed on a side of the transparent substrate opposite to the first surface.

According to some embodiments, the present disclosure further provides a manufacturing method of a circuit device with transparency, comprising the steps: providing a transparent substrate having a first surface and a second surface opposite to the first surface; forming a first transparent blocking layer on the first surface; forming a first conductive layer on the first transparent blocking layer, and forming a second conductive layer on the side of the second surface; removing a part of the first conductive layer by means of a first etching process to form a first patterned conductive layer.

As described above, the present disclosure disposes the transparent blocking layer between the transparent substrate and the conductive layer, for preventing the etching process pattern one side of the conductive layer of the transparent substrate from damaging the other side of the conductive layer of the transparent substrate on account of the laser beam or heat. The present disclosure effectively avoids the conductive layer damage aroused by etching process. Therefore, in comparison with the conventional art, the circuit

DETAILED DESCRIPTION OF THE EMBODIMENTS

Figure 1A:
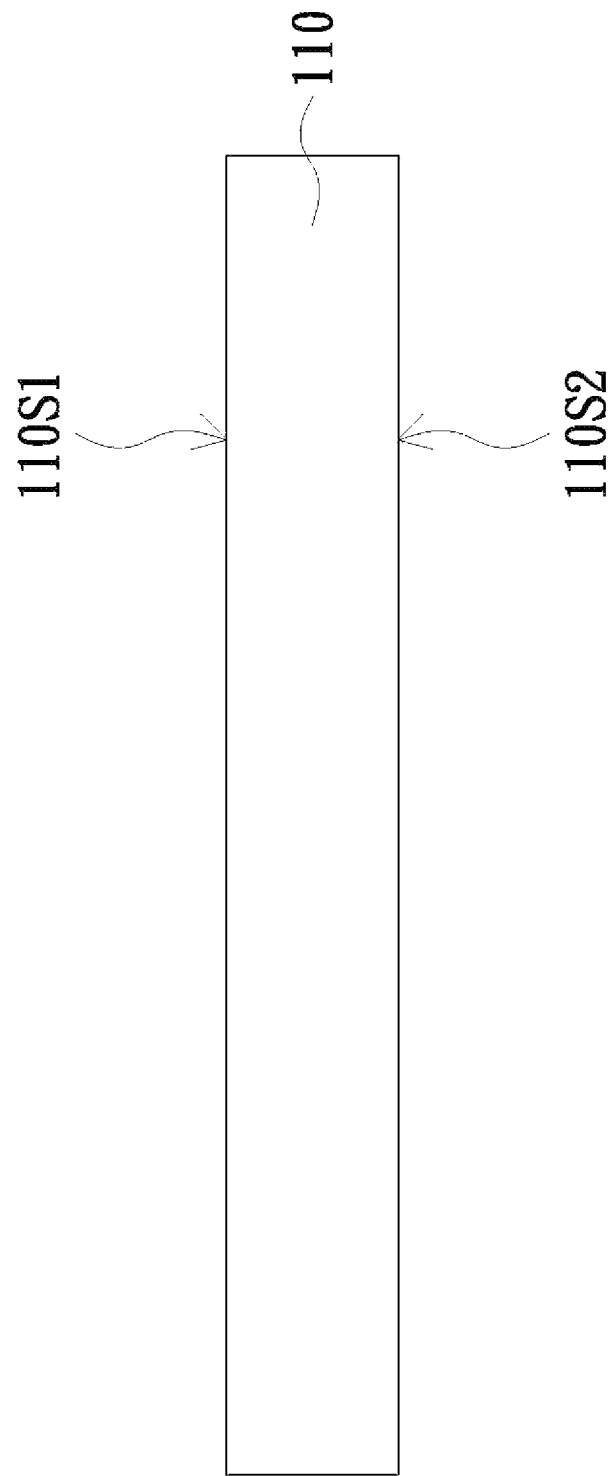
FIG. 1A-1H are process diagrams according to at least one embodiment of the present disclosure.
Figure 1B:
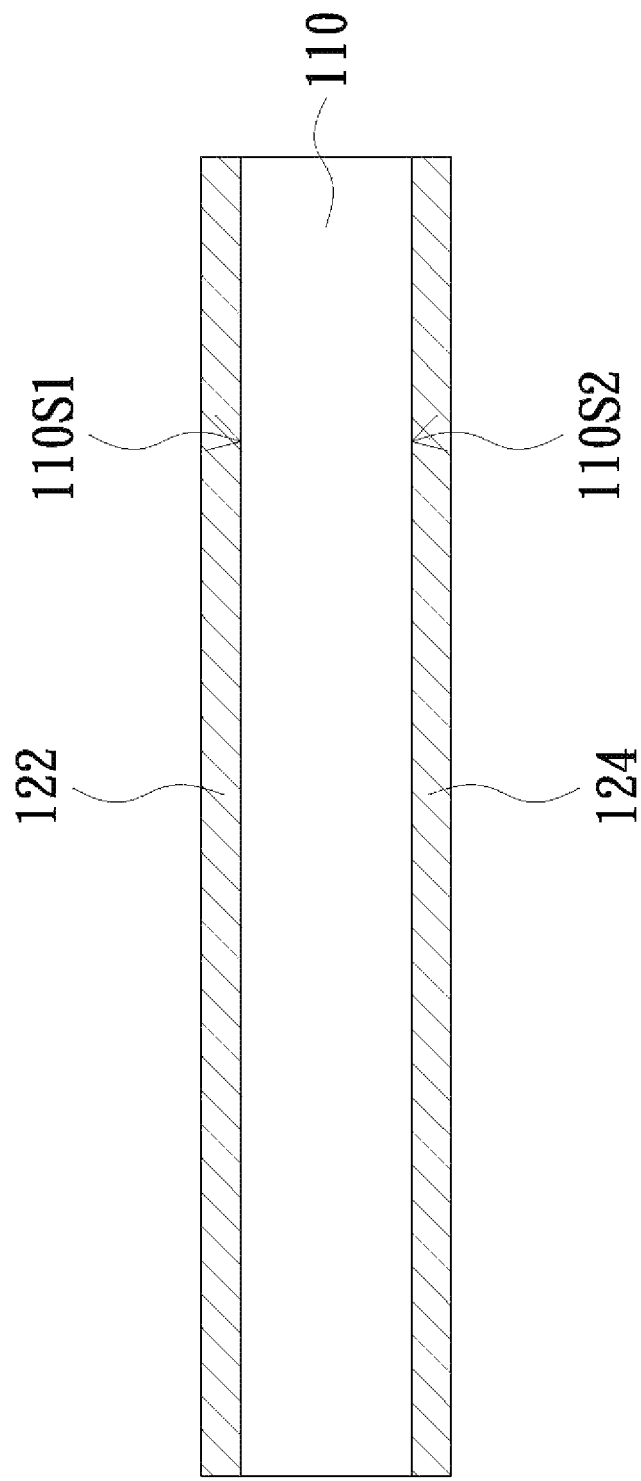
Figure 1C:
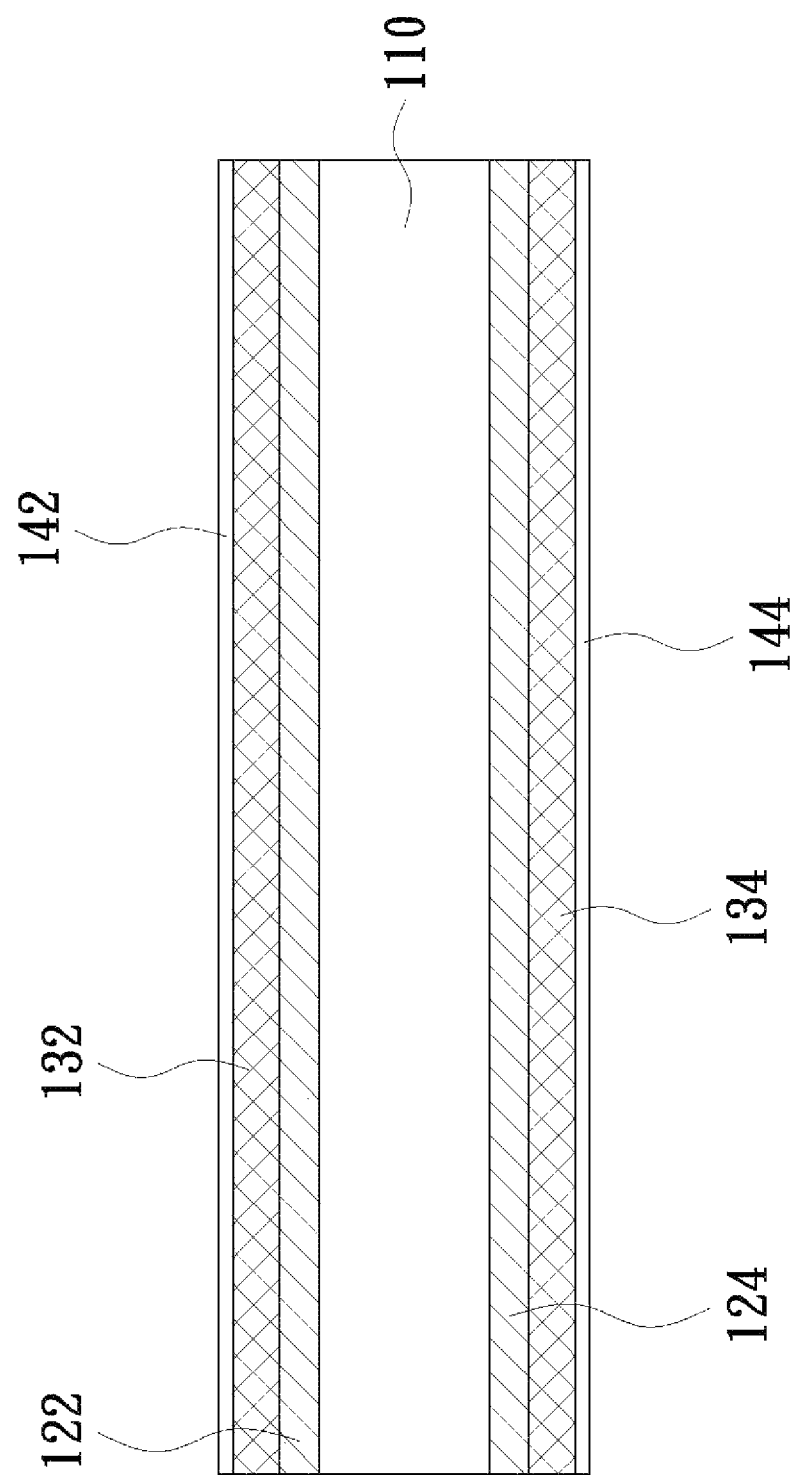
Figure 1D:
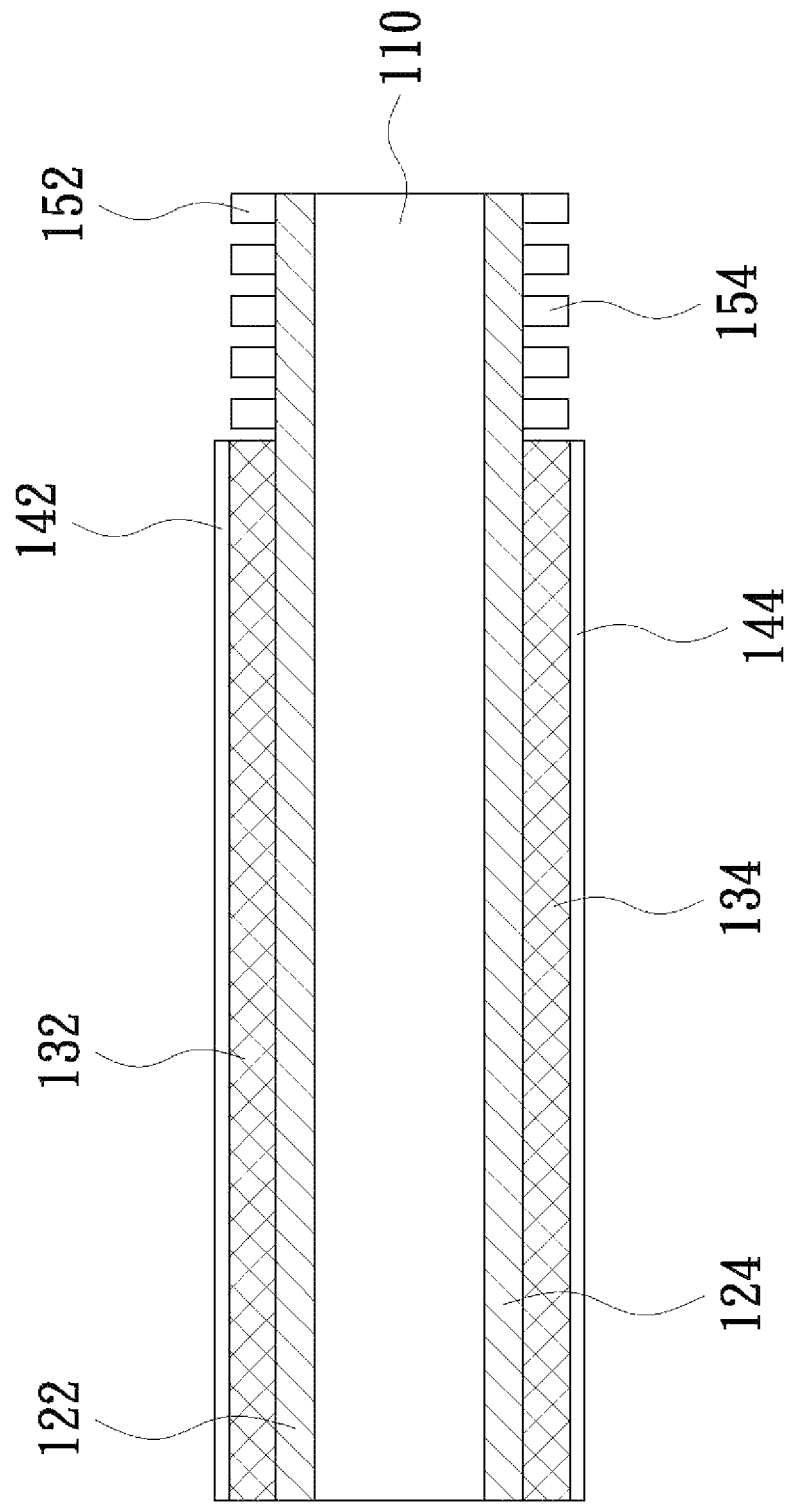
Figure 1E:
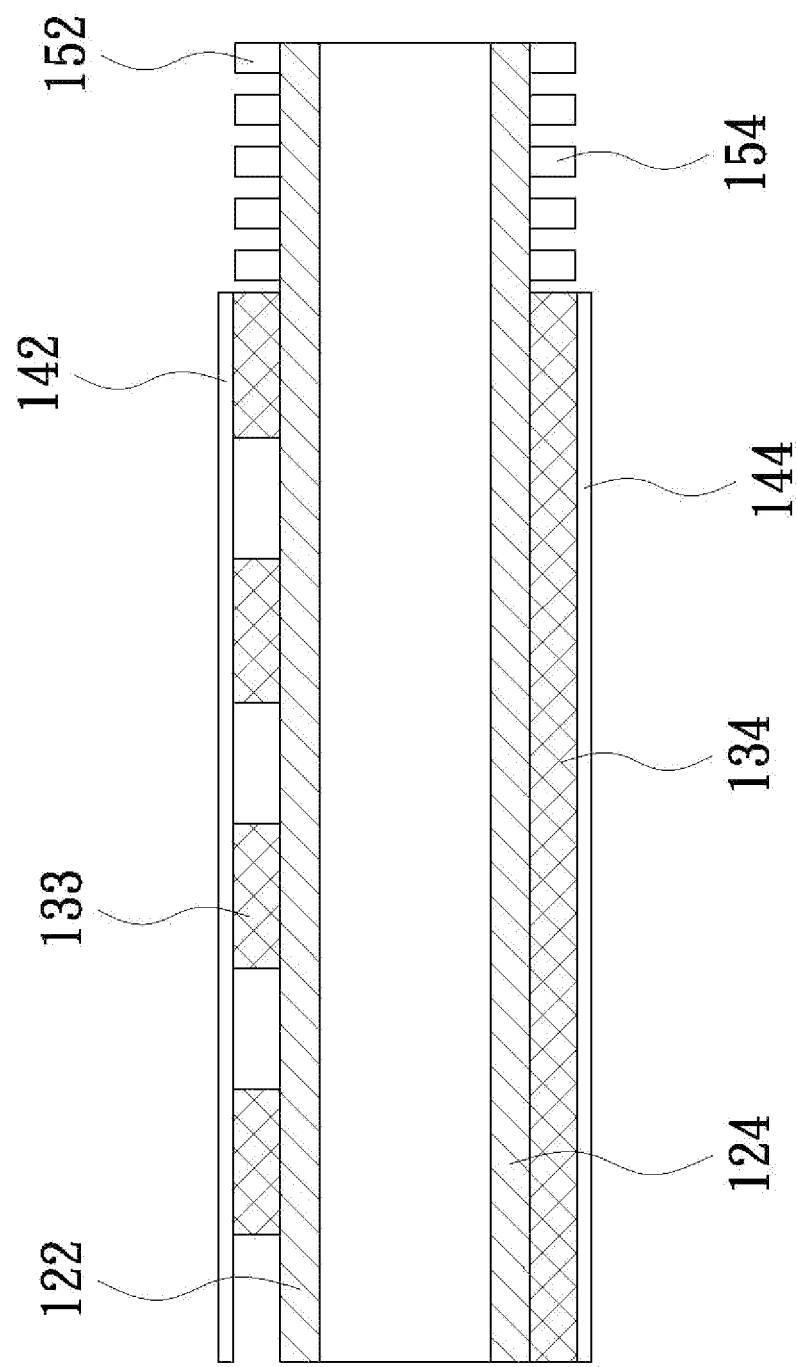
Figure 1F:
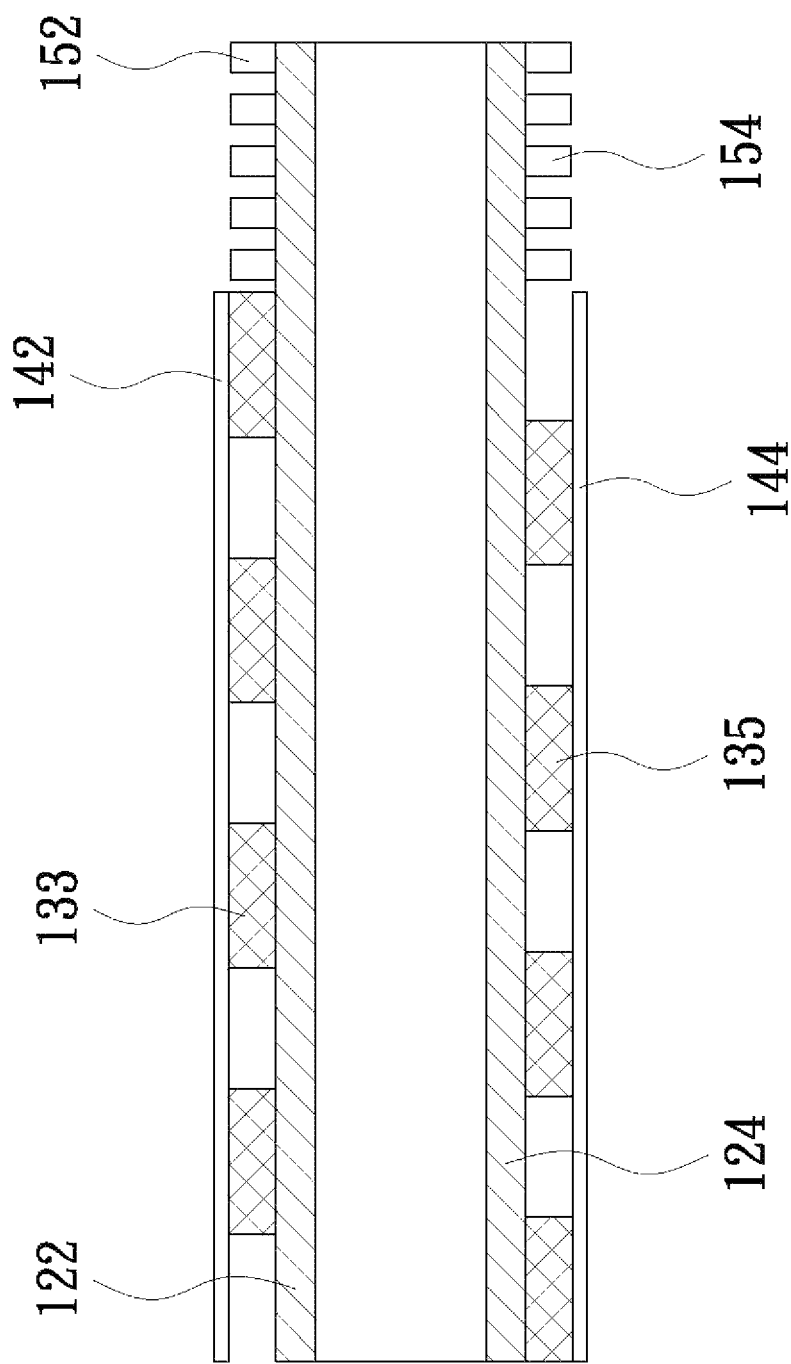
Figure 1G:
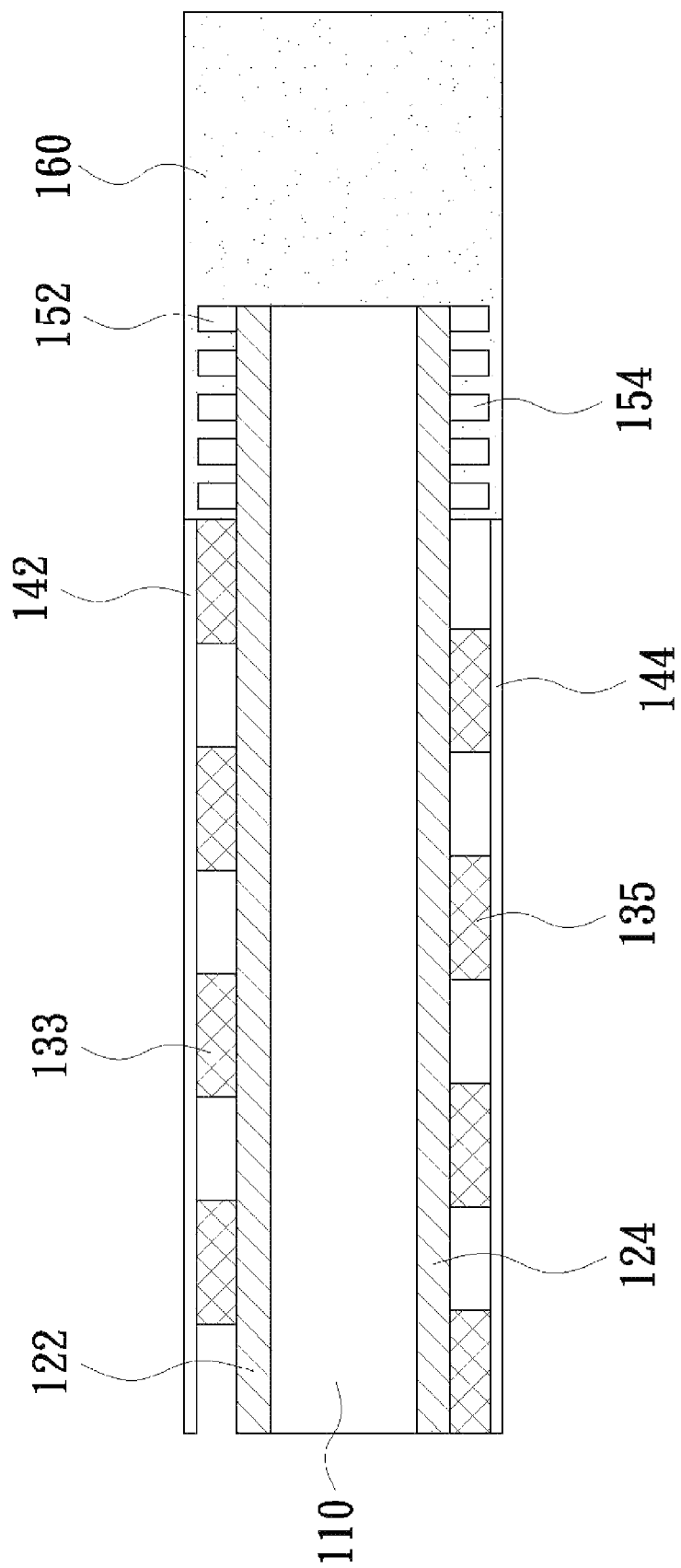
Figure 1H:
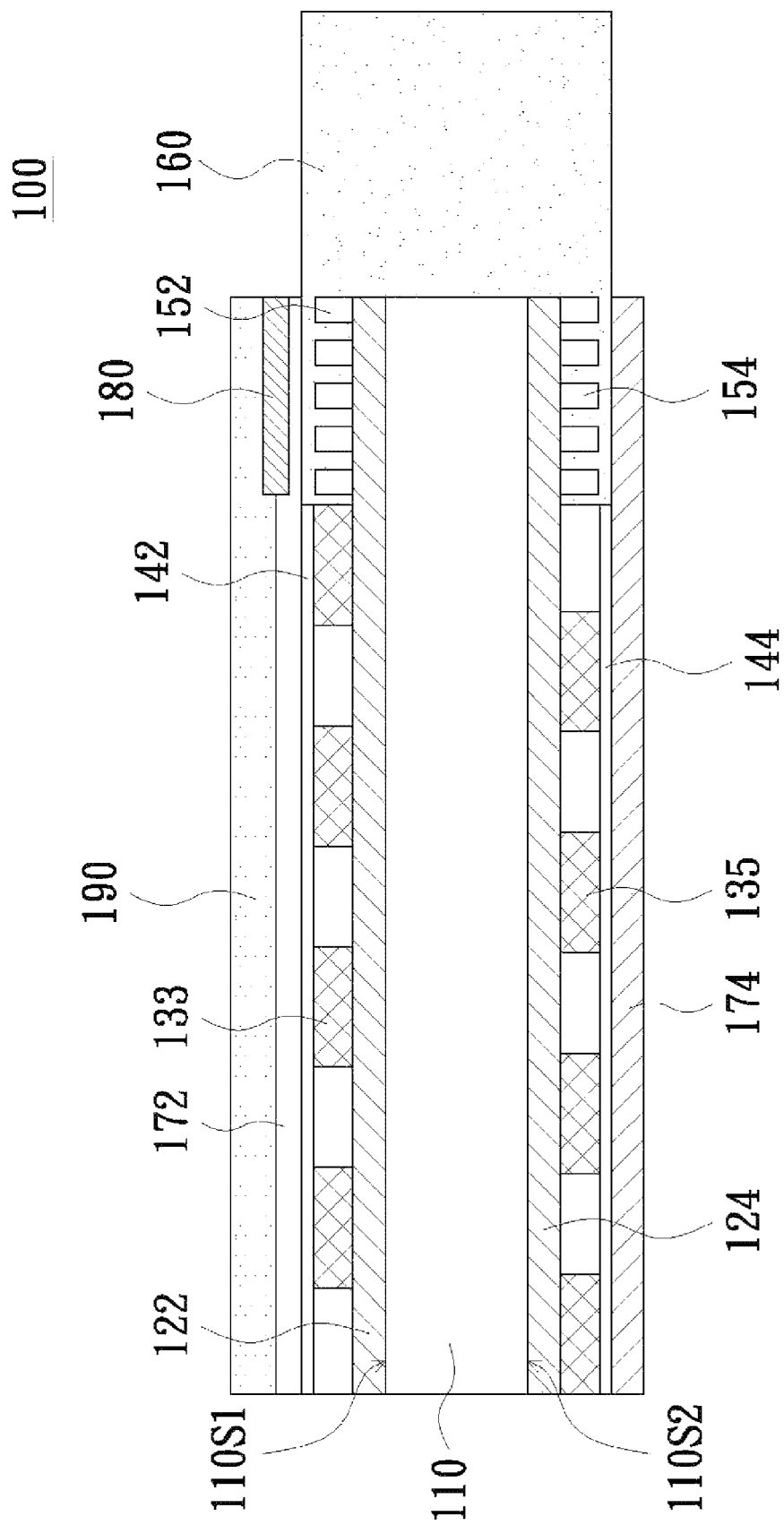

FIG. 1A-1H are process diagrams according to at least one embodiment of the present disclosure. Referring to FIG. 1A and FIG. 1H, a manufacturing method of a circuit device 100 comprises at least the following step providing a transparent substrate 110, wherein the transparent substrate 110 has a first surface 110S1 and a second surface 110S2 opposite to the first surface 110S1. Referring to FIG. 1B, a first transparent blocking layer 122 is formed on the first surface 110S1, and a second transparent blocking layer 124 is formed on the second surface 110S2.

The transparent substrate 110 is a transparent glass substrate or transparent plasticizing substrate having flexibility, or another transparent substrate made of a material having isolation characteristics. The material of the transparent plasticizing substrate comprises Polyethylene Terephthalate (PET), Cyclo-olefin polymer (COP), Polyimide (PI) or other transparent polymer. The first transparent blocking layer 122 and the second transparent blocking layer 124 is a heat blocking layer, laser beam blocking layer or a combination of the above two layers. In some embodiments of the present disclosure, the material for forming the first transparent blocking layer 122 and the second transparent blocking layer 124 is selected from Optical Clear Adhesive (OCA), transparent photoresist, transparent resin or a combination of the above materials. In some embodiments, the transparent substrate 110 is made of PET, and the first transparent blocking layer 122 and the second transparent blocking layer 124 are made of the OCA.

After forming the first transparent blocking layer 122 and the second transparent blocking layer 124, a first conductive layer 132 is formed on the first transparent blocking layer 122 and a second conductive layer 134 is formed on the second transparent blocking layer 124 (referring to FIG. 1C). Depending on the material of forming the first conductive layer 132 and the second conductive layer 134, the forming procedure of the first conductive layer 132 and the second conductive layer 134 comprises different manufacturing procedure.

In some embodiments of the present disclosure, the material for forming the first conductive layer 132 and the second conductive layer 134 is indium tin oxide (ITO), indium zinc oxide (IZO), aluminum zinc oxide (AZO) or the other fitting transparent conductive materials. By means of sputtering, deposition or coating, the first conductive layer 132 and the second conductive layer 134 is formed covering the whole surface of the first transparent blocking layer 122 and the second transparent blocking layer 124 respectively.

In various embodiments of the present disclosure, the material of the first conductive layer 132 and the second conductive layer 134 is conductive nanowires, for example, silver nanowires, gold nanowires, carbon nanotube or copper nanowires. The first conductive layer 132 and the second conductive layer 134 are coated in advance on a first transparent covering layer 142 and a second transparent covering layer 144. The conductive nanowires are evenly distributed in the first transparent covering layer 142 and the second transparent covering layer 144. The first transparent covering layer 142 and second transparent covering layer 144 have a protective effect upon the conductive nanowires to prevent oxidation thereof. The material for the first transparent covering layer 142 and the second transparent covering layer 144 is silicon dioxide (SiO2), Silicon Nitride (Si3N4), or transparent plasticizing material. Embodiments using other similar materials are also contemplated herein. Therefore, the method for forming the first conductive layer 132 and the second conductive layer 134 includes: disposing the first conductive layer 132 along with the first transparent covering layer 142 on the first transparent blocking layer 122 directly, and disposing the second conductive layer 134 along with the second transparent covering layer 144 on the second transparent blocking layer 124. In subsequent steps, the first conductive layer 132 and the second conductive layer 134 are formed by silver nanowires, but the present disclosure is not limited thereto.

Referring to FIG. 1D, by means of photolithography, at least one edge of the first conductive layer 132 and the first transparent covering layer 142 is removed, and at least one edge of the second conductive layer 134 and the second transparent covering layer 144 is removed, so as to expose a part of the first transparent blocking layer 122 and a part of the second transparent blocking layer 124. A plurality of first conductive wires 152 and a plurality of second conductive wires 154 are formed on the exposed first transparent blocking layer 122 and the second transparent blocking layer 124 respectively. The first conductive layer 132 and the first transparent covering layer 142 are adjacent to the first conductive wire 152, and the first conductive layer 132 is electrically connecting to the first conductive wire 152. The second conductive layer 134 and the second transparent covering layer 144 are adjacent to the second conductive wire 154, and the second conductive layer 134 is electrically connecting to the second conductive wire 154. A plurality of the first conductive wires 152 electrically connect the first conductive layer 132 and peripheral circuits of the flexible print circuit board. A plurality of the second conductive wires 154 electrically connect the second conductive layer 134 and the peripheral circuits of the flexible print circuit board. Both the first conductive wires 152 and the second conductive wires 154 work as a positioning target of a subsequent laser etching process. In some embodiments of the present disclosure, the plurality of first conductive wires 152 and the plurality of second conductive wires 154 are formed by means of screen printing technology, printing silver glue on a part of the first transparent blocking layer 122 and a part of the second transparent blocking layer 124 respectively. In some embodiments of the present disclosure, the plurality of the first conductive wires 152 and the plurality of second conductive wires 154 are formed on a part of the first transparent blocking layer 122 and a part of the second transparent blocking layer 124 respectively by means of metal layer deposition and patterning.

After forming the first transparent blocking layer 122, the second transparent blocking layer 124, the first conductive layer 132, the second conductive layer 134, the first transparent covering layer 142 and the second transparent covering layer 144, the remaining part of the first conductive layer 132 and remaining part of the second conductive layer 134 are patterned by means of laser etching technology. Because laser etching technology has higher directional stability and high power rate compared to photolithography, the manufacturing process is simplified and environmental pollution is reduced. Therefore, in some embodiments, it is preferable to use laser etching technology to pattern the first conductive layer 132 and the second conductive layer 134.

Referring to FIG. 1E and FIG. 1F, the step of applying the laser etching process to pattern the first conductive layer 132 and the second conductive layer 134 is shown as follows. Firstly, do a focal length adjustment, in a first etching process by using laser beam to radiate a part of the first conductive layer 132 and a part of the first transparent covering layer 142, so as to remove the radiated part of the first conductive layer 132 and form a first patterned conductive layer 133. Generally, the radiated part of the first transparent covering layer 142 will still exist without being removed, as shown in FIG. 1E. Then, in a second etching process, using a laser beam again, the laser beam radiates a part of the second transparent conductive layer 134 and a part of the second transparent covering layer 144. A second patterned conductive layer 135 is formed. The radiated portion of a part of the second conductive layer 134 is removed. Generally, the radiated portion of a part of the second transparent covering layer 144 will still exist without being removed, as shown in FIG. 1F. The first step and the second step are proceeding simultaneously according to the requirement of design. Namely, the first patterned conductive layer 133 and the second patterned conductive layer 135 are formed simultaneously or formed not simultaneously.

Furthermore, the first patterned conductive layer 133 and the second patterned conductive layer 135 are at least partially overlapped, so as to generate electrical capacitance. The circuit device 100 is, for example, a projective capacitive touch panel. The combination of the first patterned conductive layer 133, the second patterned conductive layer 135 and the isolative transparent substrate 110 form at least one capacitive component. However, the application of the circuit device 100 is not subject to limitation thereto. In various embodiments of the present disclosure, the circuit device 100 is, for example, at least one thin film transistor. The first patterned conductive layer 133, the second patterned conductive layer 135, and the isolative transparent substrate 110 and the semiconductor channel layer (not shown) formed between the first patterned conductive layer 133 and the second patterned conductive layer 135 form at least one thin film transistor.

As described above, the first transparent blocking layer 122 and the second transparent blocking layer 124 have the characteristics of blocking heat and laser penetration. When the etching process of the first transparent conductive layer 132 is proceeded by means of laser beam, the first transparent blocking layer 122 disposed between the first conductive layer 132 and the transparent substrate 110, together with the second transparent blocking layer 124 disposed between the second conductive layer 134 and the transparent substrate 110, prevents the laser beam from penetrating the transparent substrate 110 and damaging the second transparent conductive layer 134 located on the other side of the transparent substrate 110, preventing the heat generated by laser beam from damaging the second conductive layer 134. Besides, when the second conductive layer 134 is etched by means of laser beam, the first transparent blocking layer 122 and the second transparent blocking layer 124 can also be used to block the laser beam from penetrating the transparent substrate 110 and damaging the first conductive layer 132 (or first patterned conductive layer 133) of the other side of the transparent substrate 110.

In some embodiments, the first transparent blocking layer 122 and the second transparent blocking layer 124 of the present disclosure are suitable for blocking the laser beam having wavelength less than 390 nm while allowing the visible light having wavelength between 390 nm and 700 nm to pass through, so as to let the circuit device 100 be suitable for incorporation into the display device, and working as an input equipment of the display device. The thickness of the first transparent blocking layer 122 and the second transparent blocking layer 124 is between 1 µm and 20 µm, while a more preferable range is between 2 µm and 10 µm.

In some embodiments of the present disclosure, the transparent blocking layer is formed only on one side of the surface of the transparent substrate 110. If the transparent blocking layer is formed only on one side of the surface of the transparent substrate 110 (for example, the first transparent blocking layer 122 is only disposed on the first surface 110S1), rather than disposing on both sides of the surface of the transparent substrate 110, can also reach the above effects. In at least one embodiment of the present disclosure, if the circuit device 100 only has the first transparent blocking layer 122 disposed on the first surface 110S1, for the purpose of blocking and preventing the laser beam from damaging the second conductive layer 134, it is better to add the thickness of the first transparent blocking layer 122 adequately. Therefore, the preferable thickness of the first transparent blocking layer 122 ranges between 2 µm and 40 µm.

In some embodiments of the present disclosure, according to a specific structure and usage of the circuit device, the structure only needs to laser etch either the first conductive layer 132 or the second conductive layer 134, and then makes the etched conductive layer to be formed as a patterned conductive layer. On the other hand, the other conductive layer is a complete plane structure if not etched. In at least one embodiment of the present disclosure, for example the circuit device of the present disclosure applied to a touch panel, the first conductive layer 132 being patterned forms a first patterned conductive layer 133. The first patterned conductive layer 133 works as a touch sensor electrode of the touch panel. The second conductive layer 134 is a complete plane structure and works as an electromagnetic shielding layer. Comparing the corresponding manufacturing procedure with the prior embodiments, the step of laser etching the second conductive layer 134 is omitted, while the other steps are basically the same. In this way, during the step of laser etching the first conductive layer 132 to form the first patterned conductive layer 133, the first transparent blocking layer 122 and/or the second transparent blocking layer 124 is still able to prevent the laser beam from damaging the second conductive layer 134.

In some embodiments of the present disclosure, the circuit device 100 of the present disclosure further comprises a flexible print circuit board 160 (FIG. 1G). The flexible print circuit board 160 is formed on one side of the transparent substrate 110, and is electrically connected to the first patterned conductive layer 133 and the second patterned conductive layer 135 via the first conductive wire 152 and the second conductive wire 154.

Referring to FIG. 1H, a transparent covering board 190 is disposed above the first transparent covering layer 142, on a side other than the side of the first conductive layer 133. The transparent covering board 190 adheres to the first transparent covering layer 142 via a bonding layer 172. The bonding layer 172 further covers above the plurality of the first conductive wires 152. A transparent protective layer 174 is disposed above the second transparent covering layer 144 and covers above the plurality of the second conductive wires 154. A black matrix layer 180 is disposed and covers above the plurality of the first conductive wires 152, so as to shelter the first conductive wires 152. The black matrix layer 180 is disposed on the surface of the transparent covering board 190 adjacent to the surface of the bonding layer 172. The material of the bonding layer 172 is optically clear adhesive. The transparent protective layer 174 is a polyimide dielectric layer, a transparent plasticizing material layer or other similar material layer.

In some embodiments, referring to FIG. 1H, it is a structure of the circuit device 100 made by the manufacturing method according to the present disclosure. The circuit device 100 according to the present disclosure has transparency, and comprises: a transparent substrate 110, a first transparent blocking layer 122, a second transparent blocking layer 124, a first patterned conductive layer 133, a second patterned conductive layer 135, a first transparent covering layer 142 and a second transparent covering layer 144.

The transparent substrate 110 includes a first surface 110S1 and a second surface 110S2 opposite to the first surface 110S1. The first transparent blocking layer 122 is disposed on the first surface 110S1. The first patterned conductive layer 133 is disposed on the first transparent blocking layer 122. The first transparent covering layer 142 is disposed on the first patterned conductive layer 133. The second transparent blocking layer 124 is disposed on the second surface 110S2 of the transparent substrate 110. The second patterned conductive layer 135 is disposed on the side opposite to the first surface 110S1 of the transparent substrate 110. Therefore, the second transparent blocking layer 124 is disposed between the transparent substrate 110 and the second patterned conductive layer 135. Moreover, the second transparent covering layer 144 is disposed on the side of second patterned conductive layer 135 away from the transparent substrate 110. The material of the first patterned conductive layer 133 and the second patterned conductive layer 135 is, for example, a good transparency of nanowires or indium tin oxide (ITO). Wherein the nanowires are silver nanowires, gold nanowires, Carbon nanotube or Copper nanowires.

The first transparent blocking layer 122 and the second transparent blocking layer 124 have the characters of blocking heat and laser beam penetration. Therefore, in the laser etching process, the first transparent blocking layer 122 and the second transparent blocking layer 124 prevent the heat aroused by laser beam from damaging the first patterned conductive layer 133 and the second patterned conductive layer 135. The first transparent blocking layer 122 and the second transparent blocking layer 124 is a heat blocking layer, a laser beam blocking layer, or a combination of the above two layers. The material is optically clear adhesive, transparent photoresistance, transparent resin and the group of the above material combination. The thickness of the first transparent blocking layer 122 and the second transparent blocking layer 124 is actually between 1 µm and 20 mm, more preferable is between 2 µm and 10 µm. It is good to block the laser beam that the wavelength actually less than 390 nm, however, it allows visible light that the wavelength between 390 nm to 700 nm to pass through.

In some embodiments, the circuit device 200 further comprises: a plurality of the first conductive wire 152, a plurality of the second conductive wire 154, a flexible print circuit board 160, a bonding layer 172, a protection layer 174 and a transparent covering board 190. The first conductive wire 152 and the second conductive wire 154 are disposed on at least one edge of the first patterned conductive layer 133 and the first transparent covering layer 142 respectively. The second conductive wire 154 is disposed on at least one edge of the second patterned conductive layer 135 and the second transparent covering layer 144 respectively. The flexible print circuit board 160 is disposed on one side of the transparent substrate 110, via the first conductive wire 152 and the second conductive wire 154, to electrically connecting to the first patterned conductive layer 133 and the second patterned conductive layer 135 respectively. The bonding layer 172 is disposed on and covering the first transparent covering layer 142. The protection layer 174 is disposed on the second transparent covering layer 144 wherein the side of the protection layer 174 is other than the side of the second patterned conductive layer 135. The transparent covering board 190 is disposed on the bonding layer 172 wherein the side of the transparent covering board 190 is other than the side of the first patterned conductive layer 133. Besides, the circuit device 200 is, for example, a capacitive touch device or a thin film transistor. The first patterned conductive layer 133 and second patterned conductive layer 135 are at least partially overlapped.

Figure 2:
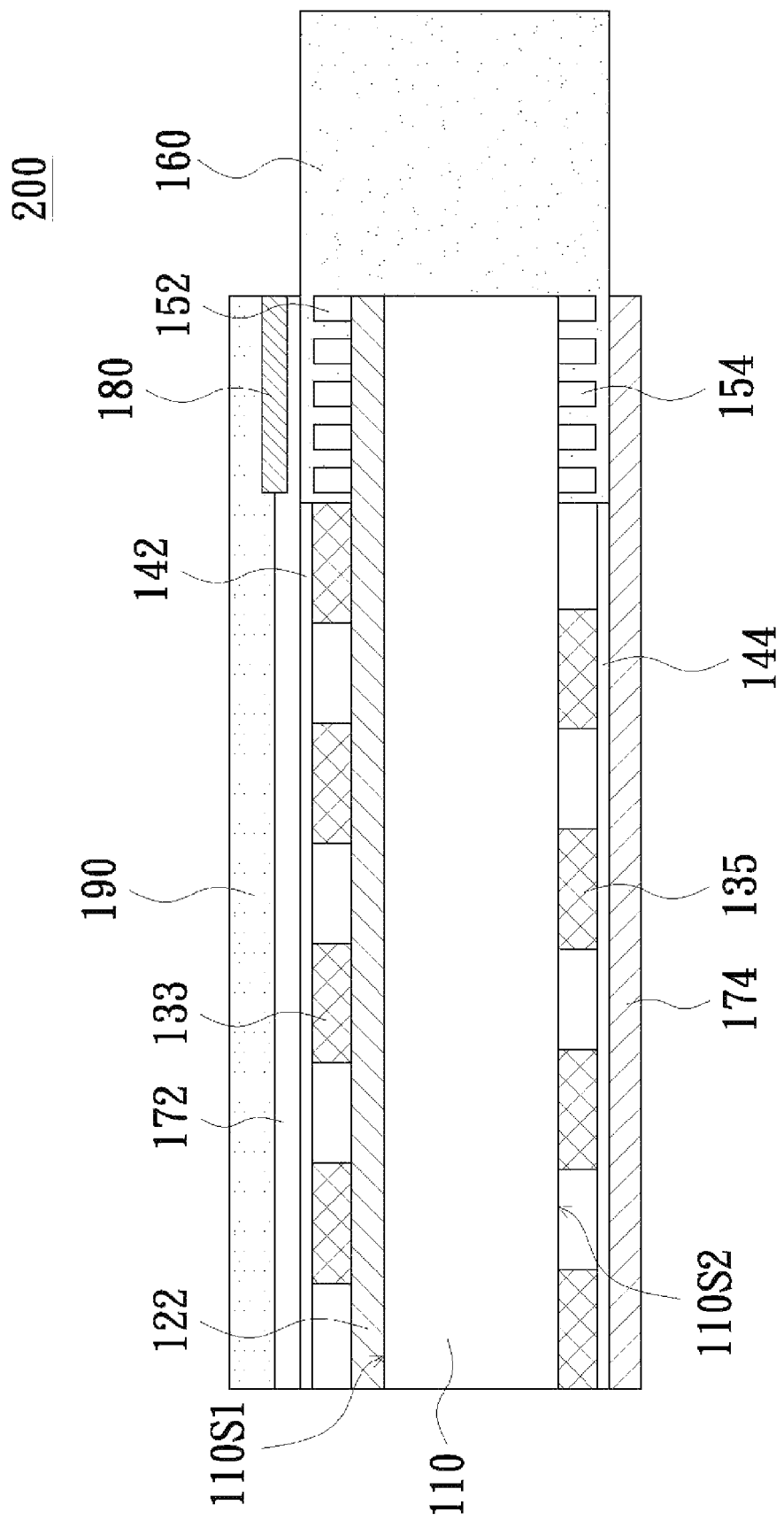
FIG. 2 is a structure of the circuit device according to at least one embodiment of the present disclosure.

Referring to FIG. 2, FIG. 2 is a structure diagram of the circuit device according to the other embodiment of the present disclosure. The difference between the circuit device 200 of the present embodiment and the circuit device structure shown in FIG. 1H lies in, the transparent blocking layer is disposed on even only one side of the transparent substrate 110 of the circuit device 200, the structure can still reach the effect that the transparent blocking layer disposed on both sides of the transparent substrate. For example, if the first transparent blocking layer 122 is disposed only on the first surface 110S1 of the transparent substrate 110, without disposing the second transparent blocking layer on the second surface 110S2 of the transparent substrate 110, then the preferable thickness of the first transparent blocking layer 122 ranges between 2 µm and 40 µm.

Figure 3:
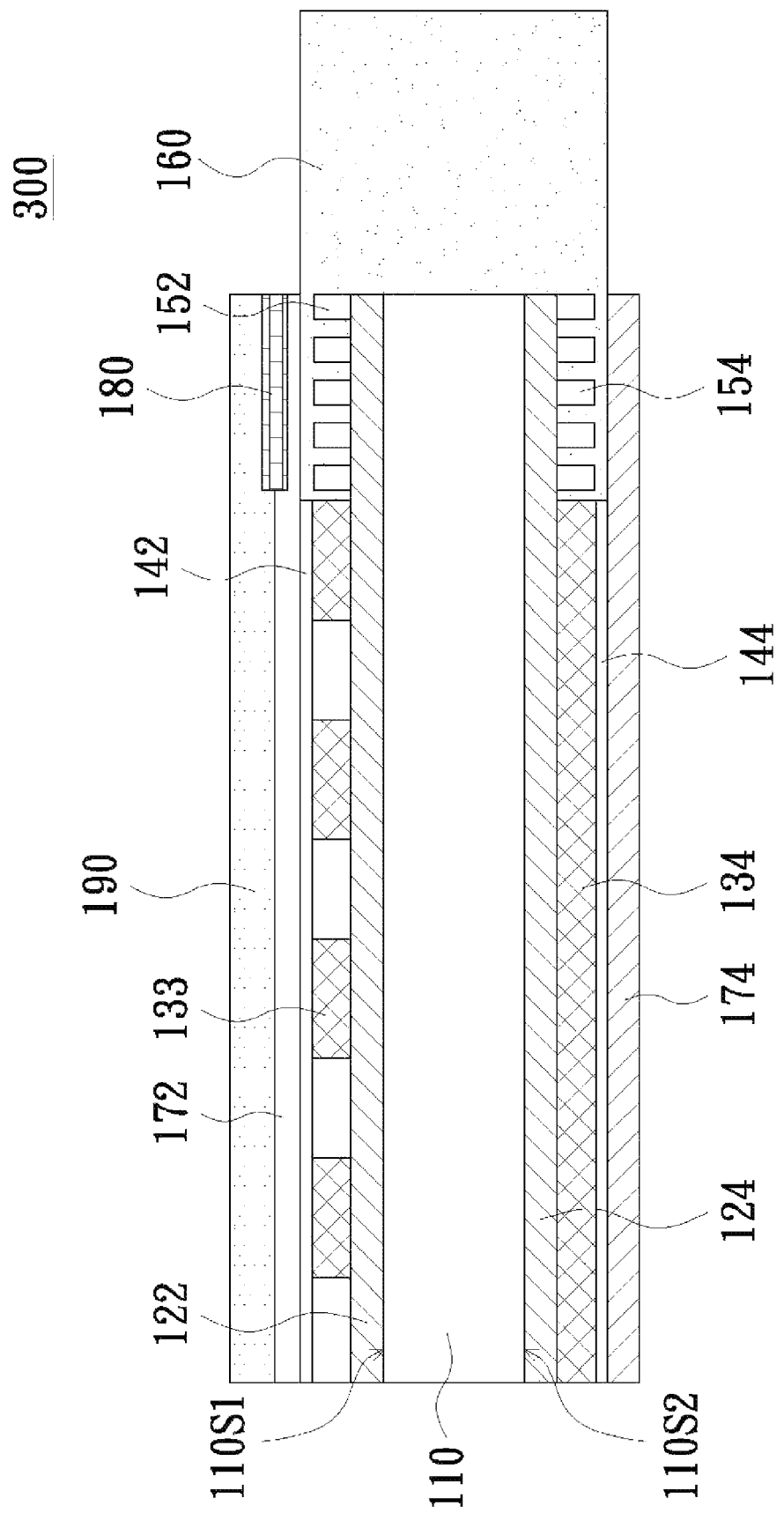
FIG. 3 is a structure of the circuit device according to at least one embodiment of the present disclosure.

In another embodiment of the present disclosure, according to a specific structure and usage of the circuit device, the conductive layer disposed on two sides of the transparent substrate, only one side of the conductive layer is a patterned conductive layer, the other side of the conductive layer is a un-patterned whole-surface conductive layer. Referring to FIG. 3, FIG. 3 is the other circuit device diagram according to the other embodiment of the present disclosure. The difference between the circuit device 300 of the present embodiment and the embodiment shown in FIG. 1H lies in, the first patterned conductive layer 133 is disposed on the first transparent blocking layer 122, the second conductive layer 134 is disposed beneath the second transparent blocking layer 124. In other words, the second transparent blocking layer 124 is disposed between the transparent substrate 110 and the second conductive layer 134. The second conductive layer 134 is an un-patterned whole-surface conductive layer. When the circuit device 300 is applied to a touch panel, the first patterned conductive layer 133 works as a touch sensor electrode for generating a touch sensor signal, the second conductive layer 134 works as an electromagnetic shielding layer for shielding the interference signals from a display or the other environmental devices. The other corresponding elements are basically the same with the embodiment of FIG. 1H.

As described above, the present disclosure disposes the transparent blocking layer between the transparent substrate and the conductive layer, for preventing the etching process pattern one side of the conductive layer of the transparent substrate from damaging the other side of the conductive layer of the transparent substrate on account of the laser beam or heat. The present disclosure effectively avoids the conductive layer damage aroused by etching process. Especially, when the material for forming the conductive layer is made of nano conductive wire, for example silver nanowire, which is sensitive to laser beam, the effect of the present disclosure would be much obvious. Because the transparent blocking layer disposed between the transparent substrate and the conductive layer having the character of blocking heat and laser beam penetration, the transparent blocking layer effectively avoids the device damage aroused by the etching process. Therefore, comparing to the conventional art, the circuit device of the present disclosure has a better yield rate.

What is claimed is:
1. A manufacturing method of a circuit device with transparency, comprising:
   providing a transparent substrate having a first surface and a second surface opposite to the first surface;
   forming a first transparent blocking layer on the first surface;
   forming a first conductive layer on the first transparent blocking layer, and forming a second conductive layer directly on the second surface, wherein forming a first conductive layer on the first transparent blocking layer and forming a second conductive layer directly on the second surface comprises:
   coating the first conductive layer on a first transparent covering layer and coating the second conductive layer on a second transparent covering layer; and
   disposing the first conductive layer along with the first transparent covering layer on the first transparent blocking layer, and disposing the second conductive layer along with the second transparent covering layer on the second surface, wherein the first conductive layer is disposed between the first transparent covering layer and the first transparent blocking layer, and the second conductive layer is disposed between the second transparent covering layer and the transparent substrate; and
   patterning the first conductive layer by a first etching process to form a first patterned conductive layer, wherein patterning the first conductive layer by a first etching process to form a first patterned conductive layer comprises:
   applying a laser beam to a first part of the first conductive layer and a first part of the transparent covering layer; and
   removing the first part of the first conductive layer while the first part of the first transparent covering layer is not removed so that the first transparent covering layer covers the first patterned conductive layer.

2. The manufacturing method of claim 1, further comprising patterning the second conductive layer by a second etching process to form a second patterned conductive layer.

3. The manufacturing method of claim 1, wherein the first transparent blocking layer is a heat blocking layer, a laser beam blocking layer, or a combination of both, and wherein the first transparent blocking layer is for blocking a laser beam having a wavelength less than 390 nm and for allowing a visible light having a wavelength between 390 nm and 700 nm to pass through.

4. The manufacturing method of claim 1, wherein a material of the first conductive layer and the second conductive layer comprises silver nanowires, gold nanowires, carbon nanotubes, or copper nanowires.

5. The manufacturing method of claim 2, wherein the first etching process and the second etching process are a laser beam etching process.

6. The manufacturing method of claim 2, wherein prior to the first etching process and the second etching process, the manufacturing method further comprises:
- forming a first transparent covering layer, the first conductive layer disposed between the first transparent covering layer and the first transparent blocking layer; and
- forming a second transparent covering layer, the second conductive layer disposed between the transparent substrate and the second transparent covering layer.

* * * * *